United States Patent
Lemieux

(10) Patent No.: US 8,064,577 B2
(45) Date of Patent: Nov. 22, 2011

(54) METHOD AND APPARATUS FOR RETRIEVING VOICEMAIL MESSAGES FROM A CLIENT/SERVER NETWORK USING A MOBILE DEVICE

(75) Inventor: Alexandre Lemieux, Gatineau (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 1187 days.

(21) Appl. No.: 11/766,836

(22) Filed: Jun. 22, 2007

(65) Prior Publication Data

US 2008/0013697 A1 Jan. 17, 2008

(30) Foreign Application Priority Data

Jul. 13, 2006 (EP) .................................... 06014553

(51) Int. Cl.
*H04M 1/64* (2006.01)
(52) U.S. Cl. ............... 379/88.17; 379/88.12; 455/412.2; 455/413; 455/417; 455/519; 455/550.1; 705/37; 715/700
(58) Field of Classification Search ............... 379/88.12, 379/88.17, 88.02; 455/412.2, 413, 519, 550.1, 455/417; 705/37; 707/6; 715/700
See application file for complete search history.

(56) References Cited

U.S. PATENT DOCUMENTS

| | | | |
|---|---|---|---|
| 6,032,039 A * | 2/2000 | Kaplan | 455/413 |
| 7,738,898 B2 * | 6/2010 | Aaron | 455/519 |
| 7,751,848 B2 * | 7/2010 | Vishwanathan et al. | 455/550.1 |
| 7,764,770 B2 * | 7/2010 | Kleinfelter et al. | 379/88.12 |
| 7,865,423 B2 * | 1/2011 | Hughes et al. | 705/37 |
| 2005/0287993 A1 * | 12/2005 | Gogic | 455/413 |
| 2006/0031336 A1 | 2/2006 | Friedman et al. | |
| 2006/0155698 A1 * | 7/2006 | Vayssiere | 707/6 |
| 2006/0264204 A1 * | 11/2006 | Livingood | 455/412.2 |
| 2007/0038934 A1 * | 2/2007 | Fellman | 715/700 |
| 2007/0066284 A1 * | 3/2007 | Gatzke et al. | 455/413 |
| 2008/0013697 A1 * | 1/2008 | Lemieux | 379/88.17 |
| 2008/0207184 A1 * | 8/2008 | Wassingbo et al. | 455/417 |

* cited by examiner

*Primary Examiner* — Gerald Gauthier

(57) ABSTRACT

A method for retrieving a voicemail message from a client/server communication network using a mobile device includes: sending a voicemail retrieval request from the mobile device to the client/server communication network, generating an RSS feed at the client/server communication network, generating an audio file that corresponds to the voicemail message at the client/server communication network and downloading the RSS feed and the audio file to the mobile device.

13 Claims, 4 Drawing Sheets

US 8,064,577 B2

METHOD AND APPARATUS FOR RETRIEVING VOICEMAIL MESSAGES FROM A CLIENT/SERVER NETWORK USING A MOBILE DEVICE

CROSS-REFERENCE TO RELATED PATENT APPLICATION

This application claims priority under 35 U.S.C. §119 from European Patent Application No. 06014553.9, filed on Jul. 13, 2006, the disclosure of which is hereby incorporated by reference herein as if set forth in its entirety.

FIELD OF THE INVENTION

The present invention relates to a method for retrieving voicemail messages from a client/server network, in particular, a method for retrieving voicemail messages using a mobile device.

BACKGROUND OF THE INVENTION

In today's working environment, professionals often spend a great deal of time away from their desks or out of the office entirely, which makes it difficult to maintain regular contact with colleagues, suppliers and/or customers. Most professionals who are away from the office dial in to a voicemail system in order to retrieve voice mail messages. Dialing in typically involves telephoning a main number and then navigating through a series of menus. The dialing in process is time consuming and must be performed often in order to ensure that important voice mail messages are retrieved in a timely manner.

For voicemail systems that include unified messaging functionalities, voicemail messages can be saved manually to a user's hard drive, converted to a file format that is supported by their mobile device and then uploaded to the mobile device. This process requires audio conversion software, which is often expensive, as well as some level of technical knowledge. Further, the process is inefficient because the time required to upload the messages often exceeds time required to listen to the messages. In addition, although this process allows the user to upload voicemail messages to a mobile device, it does not provide a solution for retrieving voicemail remotely since the user must be present in the office to perform the upload.

It is therefore desirable to provide an improved solution for retrieving voice mail messages remotely and in a timely manner.

SUMMARY OF THE INVENTION

In one aspect there is provided a method for retrieving a voicemail message from a client/server communication network using a mobile device, the method including; sending a voicemail retrieval request from the mobile device to the client/server communication network, generating an RSS feed at the client/server communication network, generating an audio file at the client/server communication network, the audio file corresponding to the voicemail message, and downloading the RSS feed and the audio file to the mobile device.

BRIEF DESCRIPTION OF THE DRAWINGS

The invention will be better understood with reference to the following Figure in which.

DETAILED DESCRIPTION OF THE PREFERRED EMBODIMENTS

Figure 1:
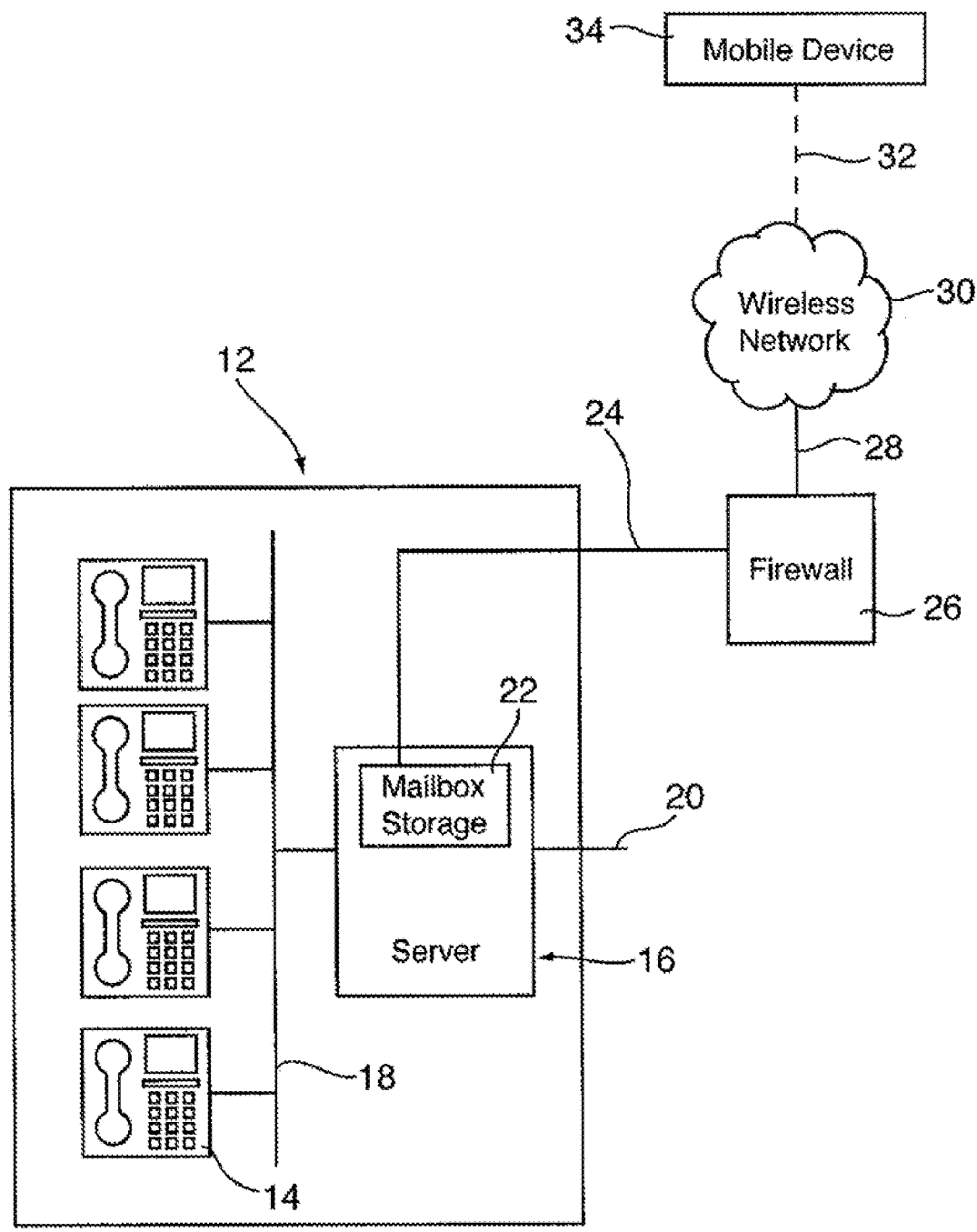
FIG. 1 is a schematic diagram of interaction between a client/server network and a mobile device according to an embodiment of the present invention.

Referring to FIG. 1, a client/server voice communication network 12 includes a plurality of IP phones 14 that communicate with a server 16 over a Local Area Network (LAN) 18. The server 16, which is also referred to as a Private Branch Exchange (PBX), manages the switching of calls within the network 12 as well as in and out of the network 12. Calls generally enter and exit the network 12 using a Public Switched Telephone Network (PSTN) line, such as line 20, for example, however, may alternatively enter and exit the network 12 using Voice over Internet Protocol (VoIP).

The client/server network 12 further includes voicemail capability that allows callers to record voicemail messages for future playback by IP phone users. Voicemail messages are saved in a mailbox storage database 22, which is provided on the server 16. Mailbox storage database 22 is made up of individual mailboxes (not shown) that are associated with each respective IP phone 14. The voicemail messages are stored in the mailbox storage 22 as WAV data.

A mobile device 34 exchanges information with the server 16 through a wireless network 30. In order to gain access to the wireless network 30, the mobile device 34 communicates with a base station (not shown) while located in a coverage area that is defined by the base station. A firewall 26 is provided between the wireless network 30 and the server 16 to control access to the server 16 for security purposes. A wireless link 32 enables communication between the mobile device 34 and the wireless network 30 and links 24 and 28 enable communication between the server 16 and the wireless network 30.

This embodiment of the present invention will be described for a mobile device 30 that is a wireless personal digital assistant (PDA), however, it will be appreciated by a person skilled in the art that the mobile device 30 may alternatively be a cellular phone, a laptop computer or a smart telephone, for example.

Figure 2:
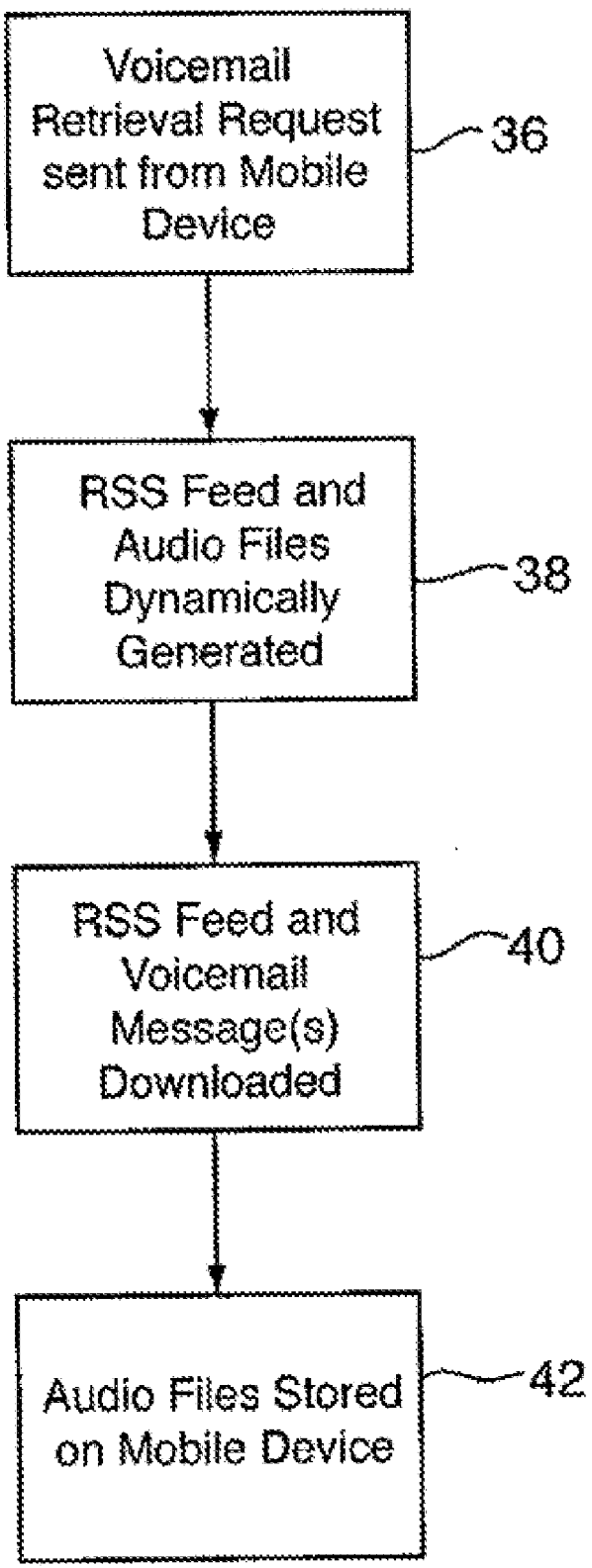
FIG. 2 is a flowchart showing a method of retrieving voicemail messages from a client/server network using a mobile device.
Figure 3:
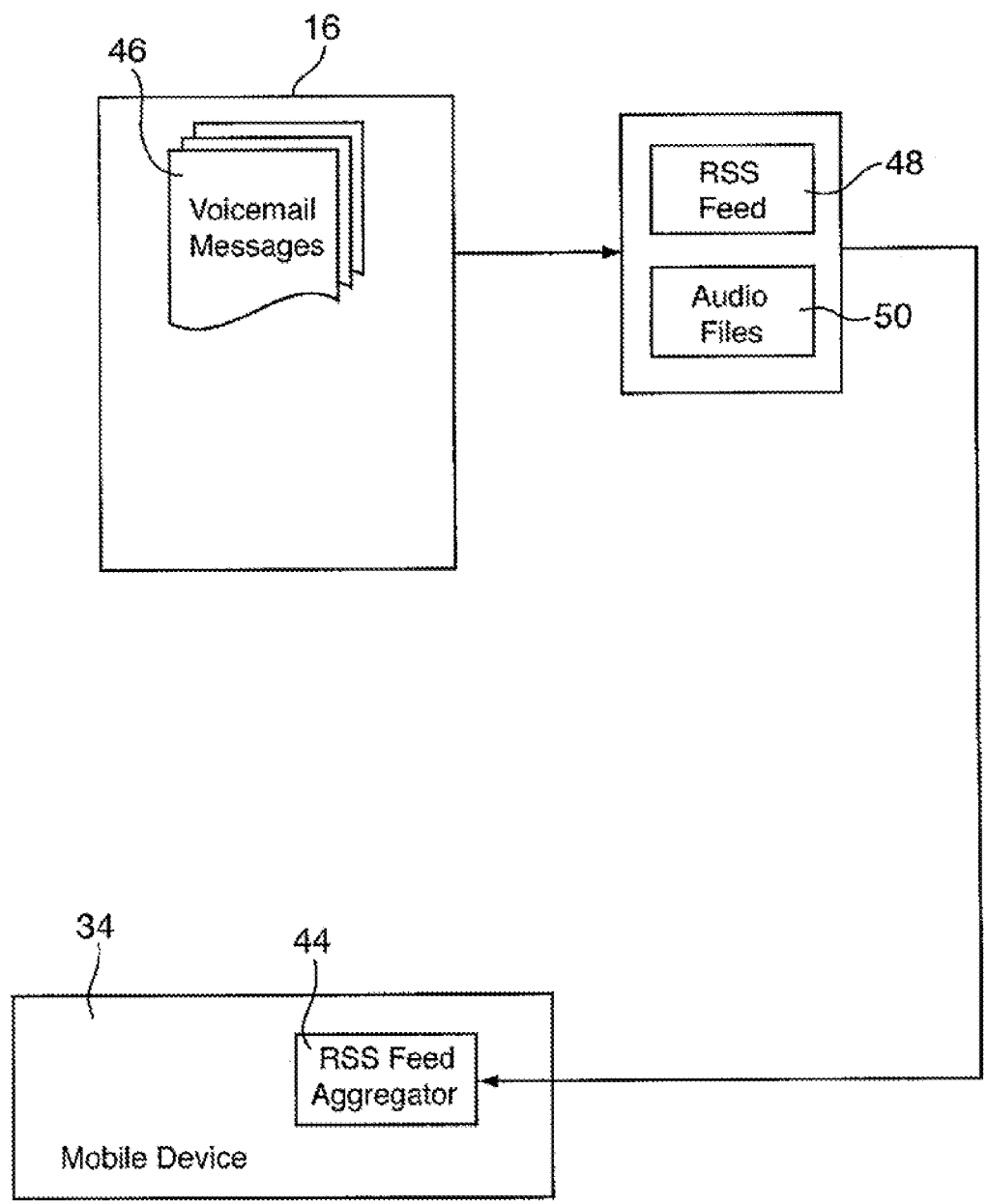
FIG. 3 is a schematic diagram generally showing operation of an aggregator.

Referring to FIGS. 2 and 3, a method for retrieving voicemail messages 46 from voicemail storage 22 using mobile device 34 is generally shown. The method includes a technique that is referred to as "Podcasting". In general, "Podcasting" uses Really Simple Syndication (RSS), which is a dialect of Extensible Markup Language (XML), to allow users to subscribe to a feed of audio files. A description of RSS format is provided at http://blogs.law.harvard.edu/tech/rss, the contents of which are herein incorporated by reference.

In order to initiate the voicemail retrieval process, an RSS aggregator 44, which is stored on the mobile device 34, sends a voicemail retrieval request to the server 16, as indicated at box 36. An RSS feed 48 and audio files 50, which correspond to voicemail messages 46, are then dynamically generated by the mailbox storage database 22, as indicated at box 38. The audio files 50 are generated by converting the WAV files into media files such as MP3 files, for example. The RSS feed 48 and the audio files 50 are then downloaded simultaneously to the mobile device 34, as indicated at box 40.

The messages are downloaded by the RSS aggregator 44, which subscribes to the RSS feed 48, and therefore, sends voicemail retrieval requests to the server 16 at user-defined intervals. The download is performed over Hyper Text Transfer Protocol (HTTP) or Secure HTTP (HTTPS).

Figure 4:
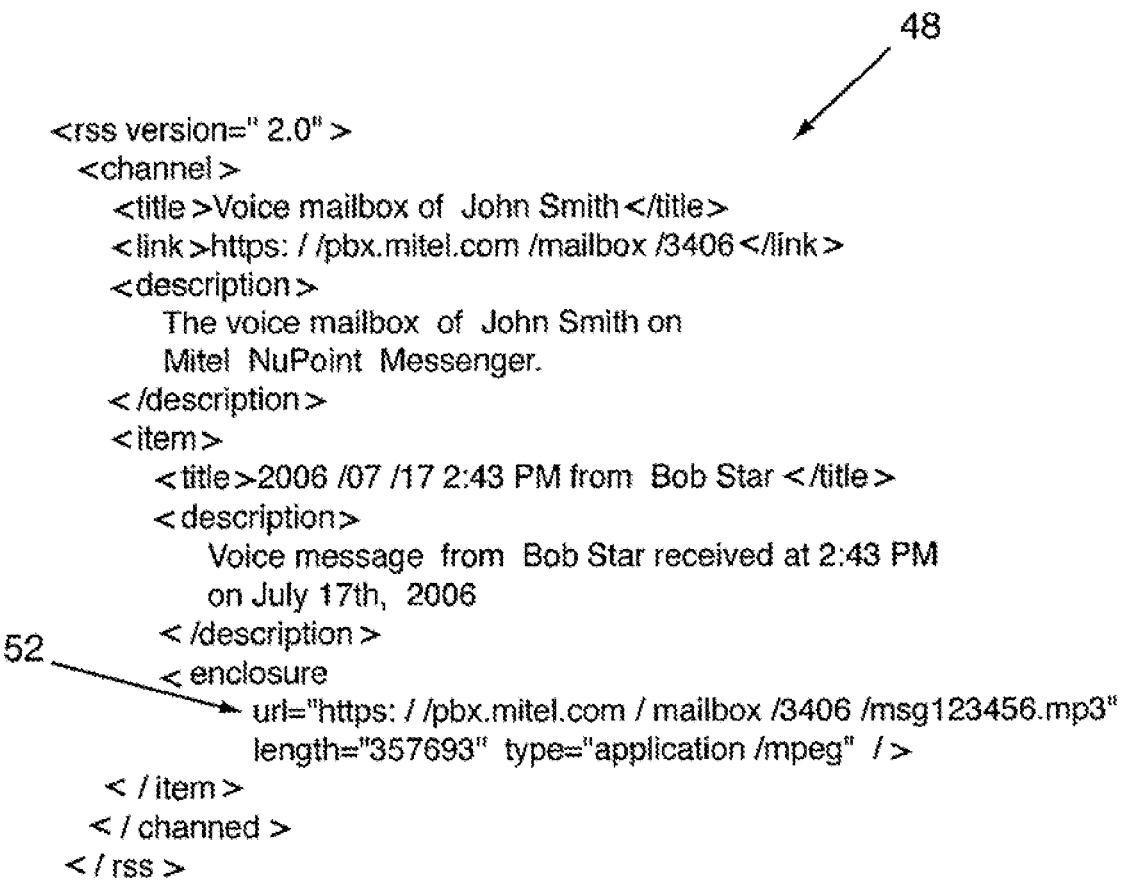
FIG. 4 is an example of an RSS feed.

An example of an RSS feed 48 is shown in FIG. 4. Each RSS feed 48 defines a "channel" and one or more "items". In the present invention, the "channel" is the user's mailbox and the "items" are new voicemail messages. A title, description and internet address is provided for the channel and for each item. The RSS feed 48 is created using server-side programming such as Hypertext Preprocessor (PHP), Java Servlets, Practical Extraction and Report Language (PERL) or Active Server Pages (ASP), for example.

The RSS aggregator 44 is generally a "Podcasting" software such as PocketRSS™, which is available for the Pocket PC™ (http://happyjackroad.net/index.asp), for example. Other podcasting software includes iTunes™ by Apple (http://www.apple.com/itunes/), iPodder™ (http://ipodder.sourceforge.net/) and Doppler (http://www.dopplerradio.net/). Other RSS aggregators include, Firefox (http://www.mozilla.org/products/firefox), which is a web browser with a "Live Bookmark" feature using RSS feeds, Thunderbird (http://www.mozilla.org/products/thunderbird), which is an e-mail and news client with RSS feeds support, Sharp Reader (http://sharpreader.net/), which is an RSS aggregator for Windows and Hand RSS (http://standalone.com/palmos/hand_rss), which is an RSS aggregator for Palm OS.

Once the RSS feed 48 and the audio files 46 have been downloaded to the mobile device 34, the audio files 50 are stored as media files in Random Access Memory (RAM) of the mobile device 34, as indicated at box 42. Alternatively, the audio files 50 are stored on a hard drive of the mobile device 34. The audio files 50 may then be played back to the user using the RSS aggregator 44. The audio files 50 may alternatively be played back using any media player that is stored on the mobile device 34.

In order to ensure that only new voicemail messages that have not been previously downloaded are retrieved, each voicemail message 44 is provided with a unique identifier and a playcount of each voicemail message 44 is tracked. Voicemail messages having a playcount that is equal to zero are determined to be unread. The playcount is stored on the aggregator 44 of the mobile device 34. The playcount may alternatively be stored on the media player.

In operation, when a new voicemail message 44 arrives in mailbox storage database 22, RSS feed 48 and audio files 50, which correspond to the voicemail message 44, are generated. The RSS feed 48 and the audio files 50 are then downloaded from the server 16 by the RSS aggregator 44 of the mobile device 34. Once downloaded, the user may play back the audio files 50 in order to listen to voicemail messages 44.

RSS feeds may be used with any type of audio file format. Because it is widely used for music downloading, "Podcasting" typically works with MP3 files. Voicemail message files, however, are typically saved in WAV format and converted to MP3 format prior when the RSS feed is generated.

In another embodiment, filtering is added to the RSS feed. Filtering would allow the user to determine how many voicemail messages to include in the feed and the order of the voicemail messages in the feed in this manner, those voicemail messages that are identified as urgent may appear ahead of less urgent voicemail messages. Filtering is incorporated by adding additional parameters to the RSS feed Uniform Resource Locator, which identified by reference numeral 52 in the example of FIG. 4. Further, business rules may be added to the RSS feed to restrict confidential messages from being downloaded using the disclosed method since "Podcasting" is allows many different users to access files.

In another embodiment, the mobile device 34 is provided with an indicator to indicate the arrival of new voicemail messages to the user. Types of indicators include a flashing light, a sound or an icon on a screen of the mobile device 34, for example. The indicator would communicate with the RSS aggregator 44 in order to determine when new messages have arrived.

In yet another embodiment, a public mailbox is created for a particular group, for example, "Project Leaders". Messages stored in the public mailbox would be accessible through a corresponding RSS feed. Members of the "Project Leaders" group could then subscribe to the RSS feed and automatically receive new voicemail messages that arrive in the public mailbox as has been previously described.

In still another embodiment, facsimiles are downloaded using an RSS feed. The facsimiles are saved in TIFF format, or another suitable format that is supported by the mobile device 30. In this embodiment, users would be able to retrieve and review facsimiles on the mobile device 30.

In still another embodiment, users having specialized RSS aggregators on their mobile devices 30 may use special attributes of the RSS feed. The special features allow the user to call back the sender of a voicemail message. Similar attributes may further be included to allow the user to reply with a voicemail or an e-mail message.

The client/server voice communication network 12 is shown being used in an office environment, however, it will be appreciated that the client/server voice communication network 12 may alternatively be a network established among a plurality of home telephones.

A specific embodiment of the present invention has been shown and described herein. However, modifications and variations may occur to those skilled in the art. All such modifications and variations are believed to be within the sphere and scope of the present invention.

What is claimed is:

1. A method for retrieving a voicemail message from a client/server communication network using a mobile device, said method comprising:
   receiving, at a server of said client/server communication network, voicemail retrieval request from said mobile device;
   generating an RSS feed at said server of said client/server communication network;
   generating an audio file at said server of said client/server communication network, said audio file corresponding to said voicemail message; and
   providing said RSS feed and said audio file to said mobile device for download.

2. A method as claimed in claim 1, wherein said mobile device includes an RSS aggregator that subscribes to said RSS feed.

3. A method as claim in claim 1, wherein said RSS feed includes a filter for selecting a presentation order for voicemail messages.

4. A method as claimed in claim 2, wherein said audio file is generated by converting said voicemail message from WAV data into a media file.

5. A method as claimed in claim 1, wherein said voicemail retrieval request is generated automatically by said RSS aggregator.

6. A method as claimed in claim 4, wherein said media file is played back using said RSS aggregator.

7. A method as claimed in claim 6, wherein said media file is played back using a media player of said mobile device.

8. A method as claimed in claim 1, wherein said voicemail retrieval requests are received at said server at user-defined intervals.

9. A method as claimed in claim 1 further comprising storing said audio file at said mobile device after download is complete.

10. A method as claimed in claim 4 further comprising storing said media file in a memory of said mobile device after download is complete.

11. A method as claimed in claim 1, wherein said generating steps are in response to receiving said voicemail retrieval request from said mobile device.

12. A method as claimed in claim 1, wherein said server comprises a private branch exchange.

13. A method as claimed in claim 1, wherein said providing step is for simultaneous download of both said RSS feed and said audio file to said mobile device.

* * * * *